United States Patent [19]
Parsons et al.

[11] Patent Number: 5,816,339
[45] Date of Patent: Oct. 6, 1998

[54] IMPLEMENT SWIVEL HITCH FOR USE WITH A QUICK-COUPLER

[75] Inventors: Stephen Kenneth Parsons, Ottumwa, Iowa; Matthew Jay Mentzer, Zweibrücken, Germany

[73] Assignee: Deere & Company, Moline, Ill.

[21] Appl. No.: 885,461

[22] Filed: Jun. 27, 1997

[51] Int. Cl.$^6$ .................................................. A01B 59/043
[52] U.S. Cl. ...................... 172/449; 172/678; 280/416.2; 56/15.7
[58] Field of Search ..................................... 172/439, 440, 172/441, 442, 443, 449, 450, 677, 679, 680, 678; 74/15.2; 56/15.2, 15.1, 15.7, 15.9, 12.6; 280/416.2

[56] References Cited

U.S. PATENT DOCUMENTS

| | | | |
|---|---|---|---|
| 4,216,975 | 8/1980 | Schafer | 280/461 A |
| 4,525,987 | 7/1985 | Werner et al. | 56/15.2 |
| 4,645,230 | 2/1987 | Hammons | 280/656 |
| 4,776,606 | 10/1988 | Stephenson et al. | 172/439 X |
| 4,793,430 | 12/1988 | Stephenson et al. | 180/14.4 |
| 5,522,208 | 6/1996 | Wattron | 56/15.1 |
| 5,706,901 | 1/1998 | Walters et al. | 172/439 |
| 5,709,274 | 1/1998 | Herbold | 172/439 X |

*Primary Examiner*—Michael J. Carone
*Assistant Examiner*—Victor Batson

[57] ABSTRACT

An implement hitch is mounted to the forward end of an implement tongue for swivelling about an upright axis. The hitch includes right- and left-hand arm assemblies which each include separate inner and outer arms mounted for swinging about a horizontal transverse axis defined by a connection pin located in respective rear ends of the arms. A first embodiment of the inner and outer arms includes apertured balls universally mounted in forward ends of the arms, with the balls of each adjacent pair of inner and outer arms having a hitch pin extending therethrough which is adapted for being received in the receptacle of the hook of the corresponding side of a quick-coupler carried by the three-point hitch of a tractor. In a second embodiment, radiused apertures are provided in the forward ends of the inner and outer arms in lieu of the apertured balls. In the first, embodiment, the arms pivot vertically relative to each other and the balls swivel within the arms when the quick-coupler tilts relative to the implement swivel hitch whereby the hitch pins also tilt without generating undue loads on the arms. The operation of the second embodiment is similar to that of the first embodiment, however, in this case the radiused apertures in the arms together with the separate movement of the arms permit the pins to tilt without generating undue loads.

5 Claims, 3 Drawing Sheets

5,816,339

IMPLEMENT SWIVEL HITCH FOR USE WITH A QUICK-COUPLER

BACKGROUND OF THE INVENTION

The present invention relates to implement hitches and, more particularly, relates to implement swivel hitches.

Swivel hitches are used to allow tighter turning with drawn implements. This is accomplished by moving the vertical pivot axis to the rear relative to where it would be if the implement were coupled to the tractor drawbar. Most swivel hitches are associated with power take-off powered implements and incorporate gear boxes at this pivot to provide smooth power transmission during tight turns. In many designs, rolling and pitching action is accommodated separately from turning. This allows the lower gearbox to be mounted rigidly to the hitch frame and avoids the need for a gearbox steering mechanism.

Many swivel hitches of the type just described attach to the pair of draft links of a typical tractor three-point hitch. A known swivel hitch of this type (see U.S. Pat. No. 4,525,987 issued on 2 Jul. 1985 to Werner et al.) has a pair of arms or links to take draft and vertical load, while allowing the tractor and drawn implement to roll relative to each other. These arms are separately mounted to a hitch frame for pivoting about a transverse axis, with each arm being more or less in fore-and-aft alignment with a respective one of the tractor draft links and connected thereto by a pin received in a ball joint contained in the draft link.

When the tractor and implement encounter uneven terrain which causes the tractor to roll relative to the implement, the implement tongue weight rests on the arm attached to the high side of the tractor hitch, and the arm attached to the low side of the hitch pivots down to follow that side of the hitch. This relative movement is permitted by the ball joints, it being noted that the pair of connecting pins move with and thus maintain the respective attitudes of the arms, which in turn reflect the attitude of the implement hitch frame.

When this type of implement hitch is used with a quick-coupler (see U.S. Pat. No. 4,216,975 granted to Schafer on 12 Aug. 1980) carried by three-point hitch links, there are no ball joints to accommodate the rolling of the tractor relative to the implement. A fairly small amount of roll will use up the pin clearances, so normal field irregularities will cause something to break.

Quick-couplers are common equipment on large tractors and add speed and ease of hitching many types of equipment to the tractor. However, the removal of a quick-coupler, as required when hitching a tractor to an implement equipped with a swivel hitch, as described above, is, because of the heavy weight of the quick-coupler, a difficult job for one person to perform and, in addition, the removal is time consuming.

SUMMARY OF THE INVENTION

According to the present invention, there is provided an improved implement swivel hitch structure and more specifically there is provided such an improvement which allows the swivel hitch structure to be used with a quick-coupler.

A broad object of the invention is to provide a swivel hitch having arms designed for permitting the hitch to be used with a quick-coupler.

A more specific object of the invention is to provide a swivel hitch having arms, as set forth in the immediately preceding object, wherein each arm has opposite sides mounted for relative pivotal movement.

Yet another object is to provide swivel hitch arms including opposite separate sides as set forth above wherein a spring is provided for yieldably holding up each side of the arms for aiding in hitching the arms to tractor draft links or a quick coupler.

These and other objects of the invention will become apparent from a reading of the ensuing description together with the appended drawings.

DESCRIPTION OF THE PREFERRED EMBODIMENT

Figure 1:
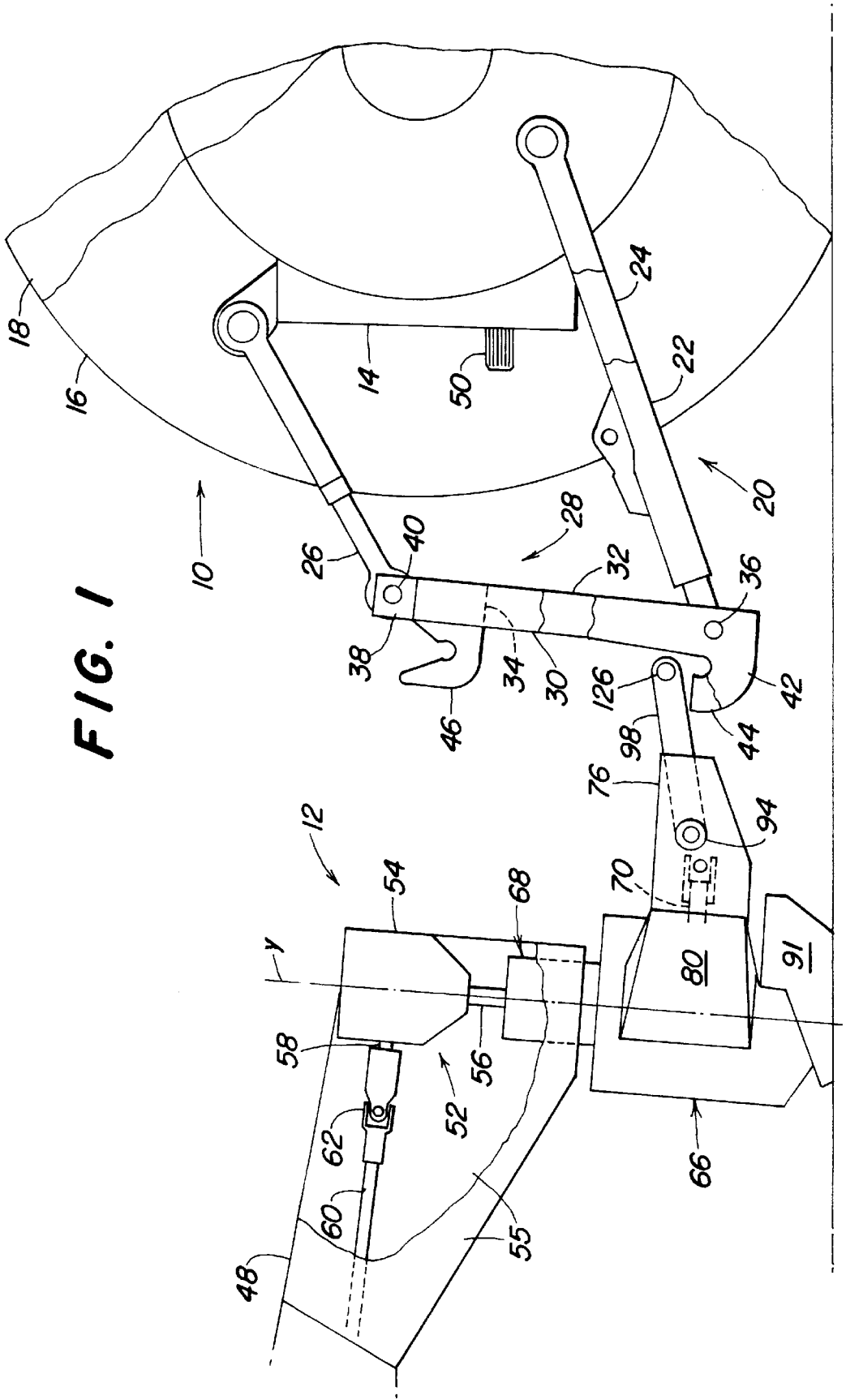
FIG. 1 is a somewhat schematic right side elevational view showing the forward end of an implement equipped with a swivel hitch embodying draft arms constructed in accordance with the present invention and showing a quick-coupler attached to a tractor three-point hitch and positioned for attachment to the draft arms of the swivel hitch.

Referring now to FIG. 1, there is shown a rear portion of a tractor 10 and a forward portion of a towed implement 12. Specifically, the tractor 10 includes a main frame 14 supported on a pair of rear ground wheels 16 and 18. A three-point hitch 20 includes right- and left-hand lower links 22 and 24, and an upper center link 26, with each link having its rear end pivotally attached to the tractor main frame 14, whereby the hitch 20 is swingable up and down relative to the frame. An inverted U-shaped quick-coupler 28 includes right- and left-hand legs 30 and 32, with a cross member 34 extending between and joined to upper end sections of the legs. Lower front portions of the legs 30 and 32 are provided with slots (not shown) respectively receiving rear ends of the lower links 22 and 24, the latter being pivotally coupled to the legs 30 and 32 by respective transverse pins 36. The cross member 34 carries a pair of transversely spaced lugs 38 located at the center of the member and pivotally coupled, as by a transverse pin 40, to a rear end of the upper center link 26 located between the lugs. Respectively forming lower integral parts of the pair of legs 30 and 32 are rearwardly projecting, upwardly opening hooks 42 and 44, and formed integrally and projecting rearwardly from a central location of the cross member 34 is an upwardly opening center hook 46.

The implement 12 is of a type including a transverse wheel-supported main frame (not shown) to which the rear end of a forwardly extending draft tongue 48 is attached for permitting the tongue to be swung from side-to-side, relative to the frame, about an upright axis. The implement 12 is further of a type adapted for being powered from a power take-off shaft 50 of the tractor 10 and includes a transmission 52 comprising an upper right-angle gear box 54 located between and fixed to a pair of vertical plates 55 defining a portion of a forward end of the draft tongue 48. The gear box 54 contains bevel gearing (not shown) coupled for transferring power from an input shaft 56 to an output shaft 58, the latter being connected to a forward end of a tongue-supported drive line 60 by a universal joint coupling 62. A lower right-angle gear box 64 (FIG. 3) is fixed to a swivel hitch 66 and is mounted to the tongue 48, by a swivel structure 68, for swivelling about an upright axis Y disposed along the input shaft 56 of the upper gear box 54 and an output shaft (not shown) of the lower gear box 64, that is coupled to the input shaft 56 and coupled through a bevel gear set for receiving power from a lower gear box input shaft 70 adapted for being coupled to the tractor to shaft 50 by a telescopic power shaft (not shown) having a structure well known in the art.

Figure 3:
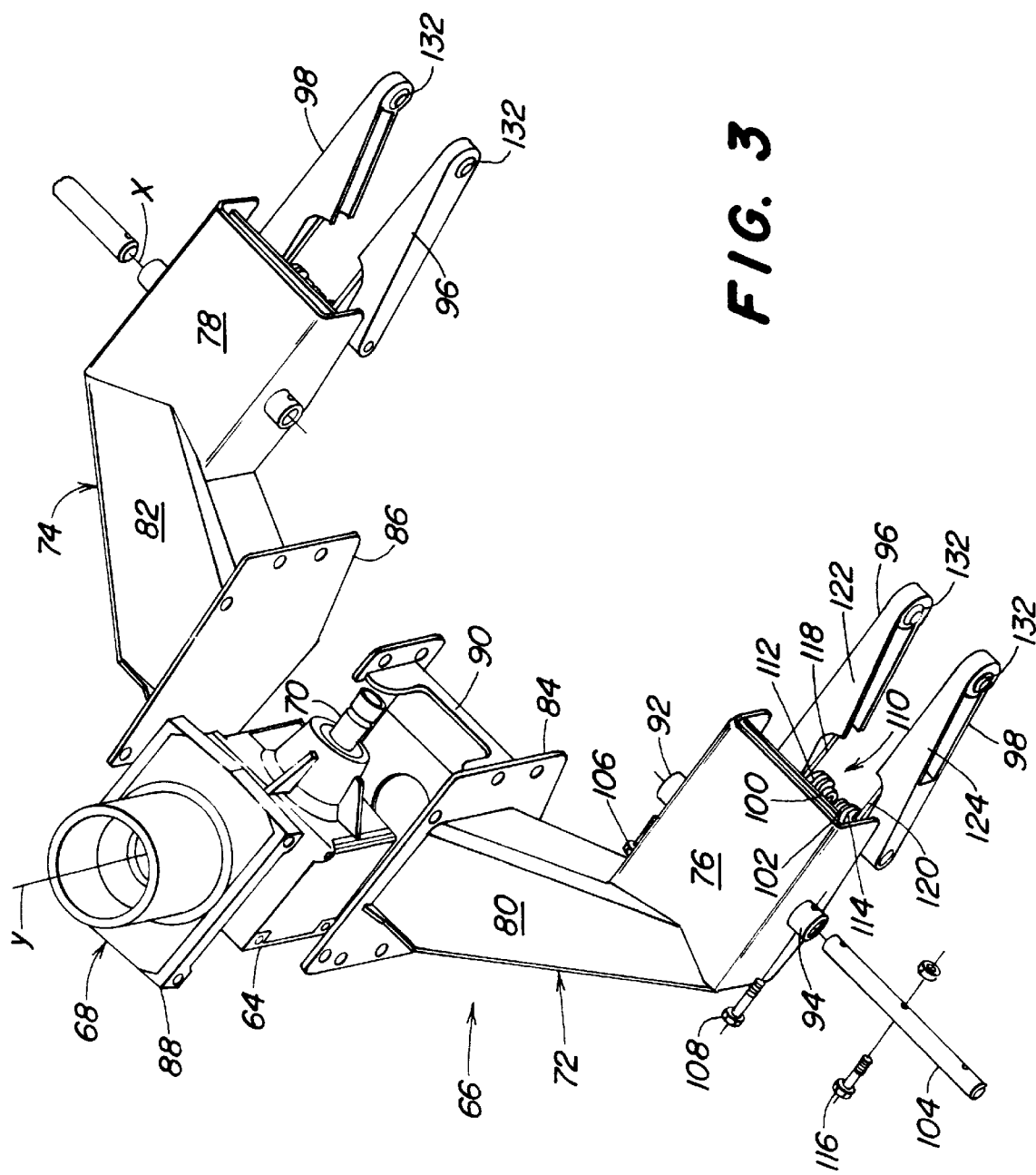
FIG. 3 is a right front perspective exploded view of the swivel hitch.

Referring now also to FIG. 3, it can be seen that the swivel hitch 66 is generally U-shaped in plan view with the legs of the U opening forwardly. The swivel hitch 66 is defined by an assembly including right- and left-hand, leg-forming members 72 and 74, respectively, having fore-and-aft extending forward ends defined by downwardly opening channel sections 76 and 78 respectively joined to inwardly and rearwardly extending intermediate sections 80 and 82 that are joined to and terminate at vertical plate sections 84 and 86. The plate sections 84 and 86 are located on opposite sides of the lower gear box 64 and a base 88 of the swivel structure 68. The right-hand plate section 84 is bolted to the gear box 54 and both of the plate sections 84 and 86 are bolted to the swivel structure base 88. A cradle structure 90 is located beneath the gear box and extends between and is bolted to the plate sections 84 and 86. Secured to a lower portion of the plates 84 and 86 is a parking foot 91 (FIG. 1 only) shown resting on the ground so as to support the hitch 66 for hook-up to the quick-coupler 28. Thus, a separate jack for this purpose is not required.

The channel sections 76 and 78 are set up identically for having identical hitch arm assemblies pivotally mounted thereto. Specifically, respectively mounted to the inner and outer flanges of the right-hand channel section 76 are axially aligned, inner and outer cylindrical receptacles 92 and 94. A right-hand pair of separate inner and outer hitch arms 96 and 98 have rear ends located in the channel section 76 and are respectively provided with opposed cylindrical receptacles 100 and 102 aligned with the receptacles 92 and 94. A transverse pin 104 is received in the aligned receptacles and is retained by a pair of fasteners 106 and 108, from rotating within the receptacles 92 and 94. A double coil spring 110 is received on the pin 104, with inner and outer coils 112 and 114 of the spring being respectively received on the inner and outer arm receptacles 100 and 102 and joined together by a bight portion (not shown) secured to the pin 104 by a fastener 116. The coils 112 and 114 terminate in respective straight ends 118 and 120 that extend beneath and are engaged with respective flanges 122 and 124 of the inner and outer arms 96 and 98. The coils 112 and 114 are wound such as to normally bias the arms 96 and 98 upwardly into contact with a forward edge of the web of the channel section 76, as shown in FIG. 1. A transverse hitch pin 126 is received in forward ends of the arms 96 and 98, and with the arms in their upper position as shown, the pin 126 is disposed for being received in the receptacle defined by the quick-coupler hook 42, as shown in FIG. 1.

The left hand arm assembly includes inner and outer arms 128 and 130 which are secured within the channel section 78 in the same way that the arms 96 and 98 of the right-hand arm assembly are attached to the channel section 76, and, for the sake of brevity, no further discussion of this connection is given.

Figure 2:
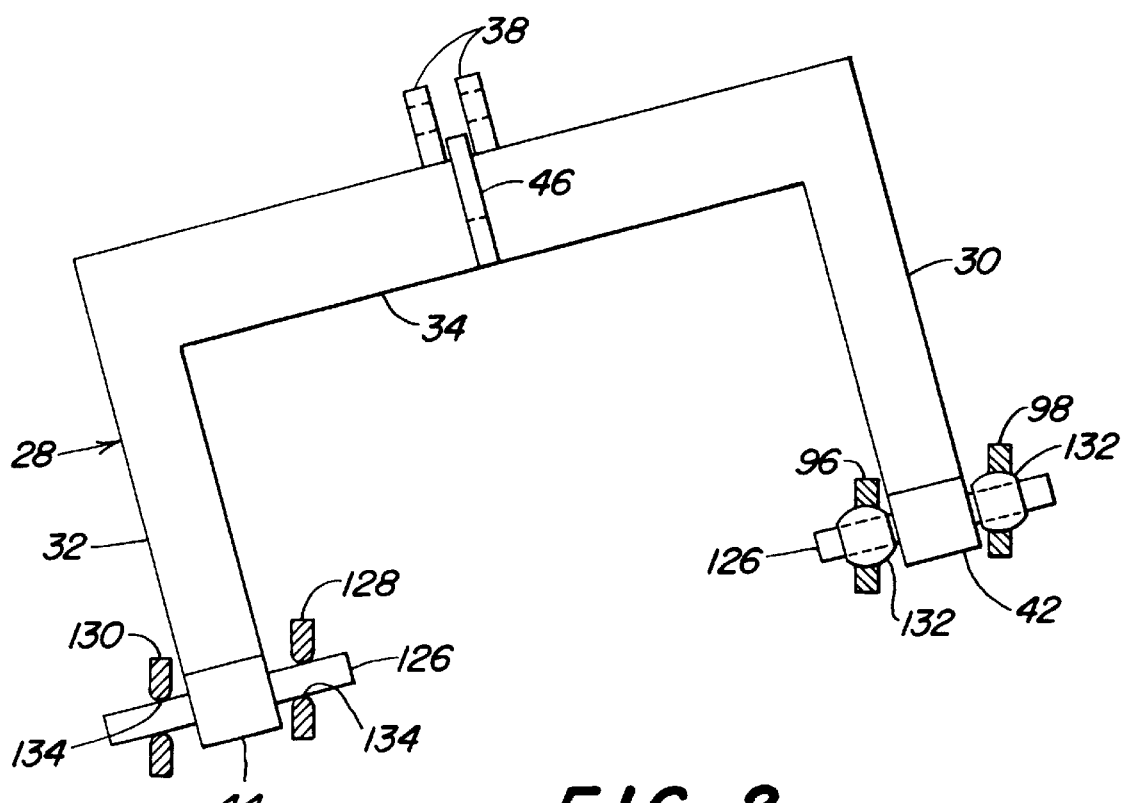
FIG. 2 is schematic rear elevational view of the quick-coupler shown tilted left-wardly relative to the horizontal and coupled to the separate halves of each of the right- and left-hand draft arms, shown here in vertical cross section, with the right-hand arm halves being illustrated as a first embodiment incorporating self-aligning balls and with the left-hand arm halves being illustrated as a second embodiment having radiused pin-receiving holes.

Referring now to FIG. 2, the quick-coupler 28 is shown tilted leftwardly relative to the right-hand pair of inner and outer hitch arms 96 and 98, and relative to the left-hand pair of inner and outer hitch arms 128 and 130, as would be the case when the implement 12 remains on level ground and the tractor 10 negotiates terrain inclined upwardly to the right from the level ground. It is noted that normally the right- and left-hand pair of hitch arms would be identical except that here, for the sake of illustration only, different embodiments of the arms are shown on opposite sides.

Specifically, the forward ends of the right-hand pair of inner and outer hitch arms 96 and 98 each contain a ball 132 in which is received the associated hitch pin 126, while the forward ends of the left-hand pair of inner and outer hitch arms 128 and 130 are each provided with a radiused hole 134 receiving the associated hitch pin 126, the radiused holes having a shape like that of a surface bounding the hole at the center of a torus. It can be seen that the hitch pins 126 are respectively received in the receptacles of the hooks 42 and 44 at the opposite sides of the quick-coupler 28 and are tilted like the quick coupler so as to lie along an axis X. The outer hitch arm 98 is shown at a higher elevation than the inner hitch arm 96, this difference in height being made possible by the fact that the arms are separate, one from the other, and by the fact that the balls 132 follow the tilting of the pin 126.

Similarly, it can be seen that the inner hitch arm 128 of the left-hand hitch arm assembly is at a higher elevation than the outer hitch arm 130, this difference in height being made possible by the fact that the arms are separate, one from the other, and by the fact that the radiused holes 134 accommodate the tilting of the pin 126.

Operation of the invention is thought understood from the foregoing description. Suffice it to say that by providing the swivel hitch 66 with the right- and left-hand pairs of separate inner and outer arms 96 and 98 equipped with balls or with separate inner and outer arms 128 and 130 having radiused holes for containing the hitch pins 126, it is possible to use a quick-coupler 28 for attaching the hitch 66 to the three-point hitch 20 of the towing tractor 10 and for the towing tractor to tilt relative to the implement 12 without undue strain being imposed on the hitch pins 126 or the draft arms 96 and 98, or, 128 and 130.

We claim:

1. In an implement including a draft tongue having a swivel hitch mounted to a forward end thereof for pivoting about an upright axis and being adapted for attachment to a quick-coupler carried by a three-point hitch of a towing tractor, said swivel hitch including transversely spaced right- and left-hand arm structures, located equidistant from an upright plane containing said upright axis, and mounted for pivoting about a first transverse axis extending perpendicular to said plane, the improvement comprising: said arm structures each including a pair of separate inner and outer arms, whereby said inner and outer arms undergo relative pivotal movement relative to each other about said first transverse axis; a mounting means, defined in respective ends of each of said inner and outer arms remote from said first transverse axis, mounting a hitch pin to said inner and outer arms for limited tilting, movement relative to said arms, whereby said hitch pin will be adapted to tilt together with the quick-coupler engaged with the hitch pin, thus resulting in said inner and outer arms assuming different angular dispositions relative to said hitch pin.

2. The swivel hitch defined in claim 1 wherein said mounting means comprises an aperture, in each inner and outer arm of each arm structure, bounded by a radiused surface shaped like an inner surface of a torus, with the associated hitch pin extending through the apertures of the inner and outer arms.

3. The swivel hitch defined in claim 1 wherein said mounting means comprises a ball universally mounted in each pair of inner and outer arms of each arm assembly.

4. The swivel hitch defined in claim 1 and further including resilient biasing means urging each of said inner and outer arms of each arm assembly to an upward hitching position.

5. The swivel hitch defined in claim 4 wherein each arm structure is mounted on a connection pin located along said first transverse axis; said resilient biasing means being in the form of a double coil spring received on each connection pin between respective inner and outer arms; each coil spring having a pair of coils joined by a bight portion fixed to the associated connection pin and terminating in free ends respectively engaged with the associated inner and outer arms; and said pair of coils of each coil spring being wound such that said associated inner and outer arms are biased upwardly so as to dispose the associated hitch pin in a position for being engaged by a hook of said quick-coupler.

* * * * *